Oct. 3, 1972   B. WALLEN   3,696,017
MEANS FOR ELECTROLYTICALLY DEPOSITING METAL ON AN OBJECT
OR FOR ANODIC OXIDATION OF AN OBJECT
Filed May 21, 1970                           2 Sheets-Sheet 1
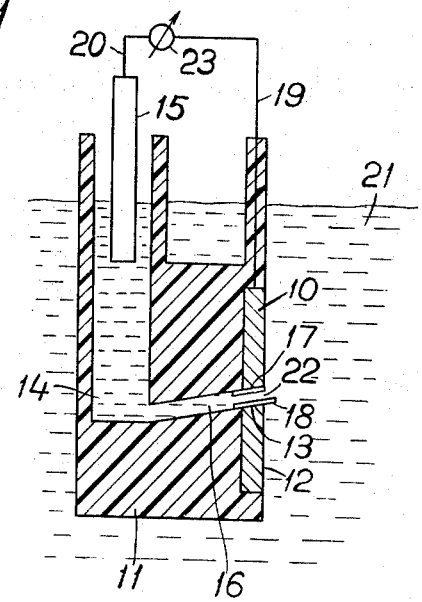
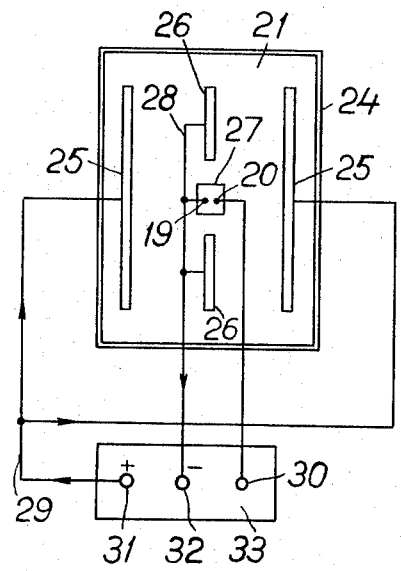
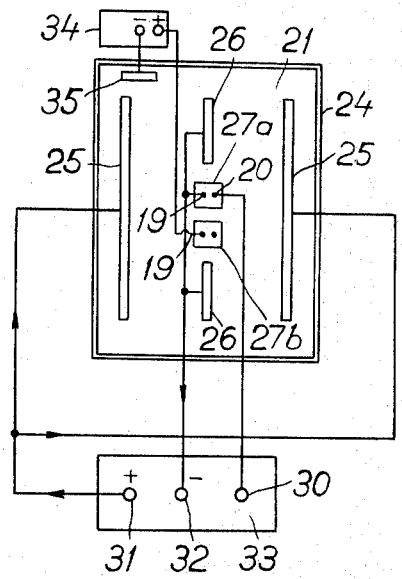
INVENTOR.
BENGT WALLEN
BY
Jennings Bailey, J

United States Patent Office 3,696,017
Patented Oct. 3, 1972

3,696,017
MEANS FOR ELECTROLYTICALLY DEPOSITING METAL ON AN OBJECT OR FOR ANODIC OXIDATION OF AN OBJECT
Bengt Wallen, Vasteras, Sweden, assignor to Allmanna Svenska Elektriska Aktiebolaget, Vasteras, Sweden
Filed May 21, 1970, Ser. No. 39,319
Claims priority, application Sweden, May 27, 1969, 7,388/69
Int. Cl. B01k 3/02, 3/04; G01n 27/30
U.S. Cl. 204—195 R                    1 Claim

ABSTRACT OF THE DISCLOSURE

A device for electrolytically depositing metal on an object or for anodic oxidation of an object immersed in an electrolytic bath, having a reference electrode in contact with the electrolyte in the bath through an ion-conducting connection to measure the potential of the object. An auxiliary electrode is placed close to the outlet of the ion-conducting connection to simulate the conditions at the surface of the object. The potential can then be measured from the auxiliary electrode.

BACKGROUND OF THE INVENTION

(1) Field of the invention

Figure 4:
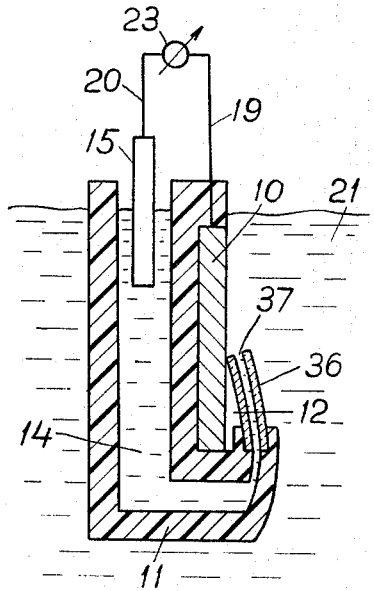

When electrolytically depositing metal on an object it is of the greatest importance for the result of the operation that the potential of the object can be accurately adjusted in relation to the potential of the electrolyte nearest to the object.

(2) The prior art

For measuring this difference in potential a reference electrode is used which is arranged in contact with the electrolyte in the electrolytic bath by means of an ion-conducting connection or is placed directly in the electrolytic bath. In order to avoid measuring errors caused by the voltage drop in the electrolyte it is of the greatest importance that the outlet of the ion-conducting connection in the electrolytic bath or the reference electrode placed directly in the electrolytic bath is arranged in the immediate vicinity of the object whose potential is to be determined. However, arranging the opening or the reference electrode, respectively, sufficiently close to the object in many cases involves considerable difficulty and in other cases is impossible. This is, for instance, the case with objects having irregular shape or when the object is moved, swings or rotates during the electrolysis. The difficulties mentioned lead to errors in the measuring results and thus a faulty estimation of the potential of the object.

The same problems exist for anodic oxidation of objects, for example anodizing.

SUMMARY OF THE INVENTION

According to the present invention the difficulties described are eliminated by using an auxiliary electrode which is immersed in the bath and on which the conditions of the object are reproduced as exactly as possible so that the measurement can be carried out at this auxiliary electrode instead of at the object.

The present invention relates to a means for electrolytically depositing metal on an object or for anodic oxidation of an object which is immersed as cathode or anode, respectively, in an electrolytic bath, said means being provided with a reference electrode which is arranged in contact with the electrolyte in the electrolytic bath through an ion-conducting connection, to measure the potential of the object. The means is characterised in that an auxiliary electrode is arranged for measurement of the potential in the electrolytic bath and that the outlet of the ion-conducting connection in the electrolytic bath is situated in the immediate vicinity of the auxiliary electrode, the surface of the auxiliary electrode, at least during the potential measurement, having the same electrochemical properties as the surface of the object.

No electrolysis current flows in the ion-conducting connection, but only the very weak current necessary for the potential measurement. The ion-conducting connection has therefore in practice the same potential all over. The distance between the auxiliary electrode and the outlet of the ion-conducting connection in the electrolytic bath is suitably at the most two millimetres. There is no theoretical lower limit for the distance, but this is determined by practicability. The minimum distance possible in practice is probably about 0.01 mm. A suitable distance for most conditions of operation is 0.1–1 mm.

The fact that the surface of the auxiliary electrode has the same electrochemical properties as the surface of the object means that during a depositing process the auxiliary electrode is coated by means of the electrolysis with the same metal as the object and during an anodic oxidation process that the auxiliary electrode is provided by means of the electrolysis with a surface consisting of the same oxidation product as the surface of the object.

The invention is of particular importance when considerable voltage gradients exist in the electrolyte, for example with the use of high current densities such as of the order of magnitude of 1 a./dm.$^2$ or higher, and with low conductivity in the electrolyte because the distance error in the measurement in such cases gives rise to greater measuring errors caused by the voltage drop in the electrolyte.

The auxiliary electrode need not be of the same material as the material in the object. As soon as the electrolysis has started, according to the invention the same metal is deposited on the auxiliary electrode as on the object so that they acquire the same electrochemical properties. The only condition as far as the material of the auxiliary electrode and the object is concerned is thus that these materials permit the same metal to be deposited. Equivalent conditions prevail for anodic oxidation.

As examples of electrolytic processes where the invention can be used, among others, the following are mentioned:

Nickel-plating steel objects coated with copper, using Watts electrolyte and nickel anodes. The auxiliary electrode may, for example, be of iron, steel, nickel, cobalt, copper or platinum.

Chromium-plating steel objects, using an electrolyte consisting of an acid water solution of sulphuric acid containing a six-valency chromium salt and with anodes of chromium. The auxiliary electrode may, for example, consist of one of the metals mentioned above.

Electrolytic refining of raw copper, using an electrolyte consisting of a water solution of sulphuric acid containing copper salt and with anodes of raw copper and cathodes of electrolytic copper. The auxiliary electrode may consist of one of the previously exemplified metals.

Anodic treatment of aluminium using an electrolyte consisting of a water solution of sulphuric acid and with anodes of aluminium and cathodes of, for example, lead. The auxiliary electrode consists of aluminium.

According to an advantageous embodiment of the invention, the ion-conducting connection consists of a bridge containing the same electrolyte as the bath, the reference electrode being arranged in a space containing this electrode which space, through the outlet of the ion-conducting connection, is in open communication with the electrolytic bath. This embodiment is partcularly simple and reliable in operation. The ion-conducting connection may, of course, consist of a salt bridge of conventional type provided with an ion-conducting plug in the opening which prevents the electrolyte in the salt bridge from running out into the electrolytic bath. The salt bridge may consist, for example, of a tube or hose of insulating material such as glass or a plastic with a plug of agar-agar compound which has been made ion-conducting, for example with potassium chloride solution. As electrolyte in the tube or hose a water solution of potassium chloride, for example may be used.

According to another embodiment of the invention the ion-conducting connection is arranged to pass through a hole having insulated walls through the auxiliary electrode from the side of the auxiliary electrode which faces away from the outlet of the ion-conducting connection to the side of the auxiliary electrode where the outlet is situated. According to this embodiment, not only is it possible to achieve a very short measuring distance, but any disturbance of the current lines in the measuring area is completely avoided and the measuring accuracy is thus improved. It is of course possible to arrange the outlet on the measuring side of the auxiliary electrode without passing it through the auxiliary electrode if it is ensured that the auxiliary electrode is not screened off, for example by the ion-conducting connection being shaped as a thin capillary. However, always of essential importance is that the distance between the outlet and the auxiliary electrode is short and that its position is definitely fixed in relation to the auxiliary electrode.

The size of the outlet may with advantage be 0.1–3 mm., preferably 0.2–2 mm.

According to another advantageous embodiment of the invention the auxiliary electrode is built together with the ion-conducting connection to form a rigid unit. The auxiliary electrode and its accessories may thus be given a robust form so that it is easy to move them from one bath to another and the unit is insensitive to jolts. A particularly simple construction can be effected if the unit comprises a body of insulating material, for example a cured resin body, in which the auxiliary electrode is attached on one side, situated on the opposite side from that where the outlet of the ion-conducting connection is situated and in which the ion-conducting connection is arranged in a space which is in communication with the electrolytic bath by way of a hole having insulating walls and passing through the auxiliary electrode.

In order to avoid unnecessary deposits of metal on the auxiliary electrode and consequently an altered distance to the outlet of the ion-conducting connection, it is advisable for the auxiliary electrode with the reference electrode to be connected only during the actual electroplating process. The metal coating can of course be removed by dissolving the coating on the auxiliary electrode chemically or electrolytically. It is also possible to use two auxiliary electrodes in the same bath for alternate use during the measurement, one of the auxiliary electrodes being connected to an auxiliary circuit not having a pole common with the poles of the electrodes of the bath, to dissolve metal deposited on this auxiliary electrode.

The invention will be described in more detail in the following with reference to the accompanying drawings in which FIG. 1 shows an auxiliary electrode according to the invention, built to form a unit with the ion-conducting connection which passes through a hole in the auxiliary electrode, FIG. 2 a means according to the invention comprising one auxiliary electrode, FIG. 3 such a means comprising two auxiliary electrodes, FIG. 4 an auxiliary electrode according to the invention where the ion-conducting connection is shaped as a capillary on the measuring side of the auxiliary electrode, and FIG. 5 a modification of the arrangement shown in FIG. 2.

In FIG. 1 the auxiliary electrode, consisting of carbon steel or platinum, for example, is designated 10. It is attached in a body 11 of a cured resin, for example an epoxy resin, which is firmly attached to the auxiliary electrode so that it surrounds the electrode except for the outwardly facing side 12. The auxiliary electrode has a central hole 13. A space 14 is hollowed out in the resinous body for the insertion of the reference electrode 15, for example a calomel electrode. This space is connected to the hole 13 of the auxiliary electrode by means of a channel 16 communicating with the space. The hole in the auxiliary electrode is internally insulated by means of a hose 17, for example, of plastic such as polytetrafluoroethylene. Its inner diameter is about 1 mm. Its lower edge 18 projects a short way outside the outer side of the auxiliary electrode in order to prevent the formation of gas bubbles at the opening of the hose. The connection conduits of the auxiliary electrode and the reference electrode are designated 19 and 20, respectively. The connection conduit 19 is surrounded by the resinous body to a level lying above that of the electrolytic bath. During the measuring process the described means is immersed in an electrolytic bath 21. The electrolyte passes into the space 14 in the resinous body with its channel 16, so that the electrolyte level in the space 14, which is open at the top, is the same as that in the electrolytic bath. As is also clear from the drawing, the hole 13 of the auxiliary electrode and the channel 16 form the only communication between the space 14 and the electrolytic bath 21. In the device shown the ion-conducting connection between the reference electrode 15 and the electrolytic bath 21 consists of the electrolyte in the space 14 with its channel 16 and the insulated hole 13. The outlet of the ion-conducting connection is formed by the outwardly facing end 22 of the hose 17. The potential measurement can be carried out by a high-ohmic volt meter 23 connected between the conduits 19 and 20. The hole 13 need not be positioned centrally in the auxiliary electrode, but may be positioned eccentrically, for example at the edge.

FIG. 2 shows a device according to the invention, seen from above. It comprises an electrolytic bath 21 having an electrolyte consisting of Watts electrolyte (nickel salt solution with boric acid). The electrolysis vessel is designated 24. The anodes 25 are of nickel. The objects to be nickel-plated (the cathodes) are designated 26. They consist of copper-coated steel objects. The measuring device shown in FIG. 1 is immersed in the electrolytic bath in the manner shown in FIG. 1 and is designated 27 in FIG. 2. The auxiliary electrode 10 is connected in parallel with the objects 26 by the connecting conduit 19 being connected to the cathode cable 28. The anodes are connected to a common anode cable 29. The connection conduit 20 from the reference electrode, as well as the anode and the cathode cables, is connected to terminals 30, 31 and 32, respectively, on a potential-regulated rectifier 33. Immediately after the start of the electrolysis, the objects 26 and the auxiliary electrode 10 become coated with a layer of nickel so that in this way they acqure the same electrochemical properties.

The potential difference measured by the reference electrode 15 during the electrolysis between the auxiliary electrode 10 and the electrolyte at the outlet 22 corresponds to the potential difference between the objects 26 and the electrolyte in their immediate vicinity. If the result obtained during the measurement does not correspond to the desired value for the electrolysis, that is the desired value for which the rectifier is set, the rectifier automatically adjusts the electrolysis current so that the desired potential difference is obtained.

FIG. 3 shows a device having two measuring means according to the invention, one of which 27a functions in the manner described in connection with FIG. 2, and the other 27b is connected as the anode in an auxiliary circuit to remove its nickel coating. This auxiliary circuit, which is galvanically separated from the circuit having the potential-regulated rectifier 33, comprises a current source 34, a supplemental cathode 35 of, for example, steel, the auxiliary electrode 10 in the measuring means 27b and the electrolyte in the electrolytic bath 21. When the auxiliary electrode in the means 27b has been cleaned, this measuring means is used during the following electrolysis while the measuring means 27a is instead connected into the auxiliary circuit.

In the arrangement shown in FIG. 4, the part of the ion-conducting connection situated nearest to the auxiliary electrode is shaped as a capillary on the measuring side of the auxiliary electrode. In this arrangement, which is a modification of that shown in FIG. 1, the designations are the same as in FIG. 1 for corresponding parts. In this case the ion-conducting connection does not penetrate the auxiliary electrode but is shaped differently, as mentioned. The part situated nearest to the auxiliary electrode 10 consists of a tube of an electrically insulating material such as a glass or plastic tube 36, the opening 37 of which is extended to form a capillary having an inner diameter of 0.2 mm. and a wall thickness og 0.1 mm. The distance between the opening 37 and the surface of the auxiliary electrode is between 0.1 and 0.2 mm. The tube 36 is sealed to the resinous body 11, for example by means of glueing.

Figure 5:
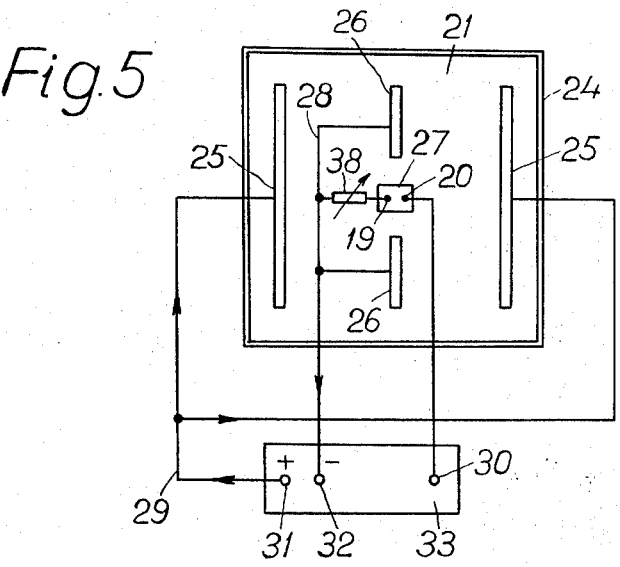

FIG. 5 shows a modification of the device according to FIG. 2 which permits great freedom in positioning the auxiliary electrode in the electrolytic bath. In the arrangement according to FIG. 2, the auxiliary electrode should be placed at approximately the same distance as the cathodes 26 from the anodes 25. Such is not the case in the arrangement according to FIG. 5 which differs from that according to FIG. 2 only in the presence of the variable resistance 38 which may consist, for example, of a conventionally adjustable wire resistance. This is connected between the auxiliary electrode and the objects being treated in the electrolytic bath. The resistance 38 makes it possible to reduce too high a current concentration to the auxiliary electrode, resultant when the auxiliary electrode is placed nearer to the counter electrodes than the objects to be coated or treated in the electrolyic bath. In the special case shown in FIG. 5, therefore, the resistance 38 is connected between the auxiliary electrode and the objects 26 (the cathodes). It is thus possible to reduce the too high current concentration to the auxiliary electrode which results if this electrode is placed nearer to the anodes 25 than the distance between the cathodes 26 and the anodes 25.

Of course the arrangement according to FIG. 3 can also be modified in a corresponding manner by the insertion of a variable resistance 38.

I claim:

1. For use in a bath containing an electrolyte for electrochemical treatment of an object immersed as an electrode therein and having a main electrode of opposite polarity from the object, a device including an auxiliary electrode adapted to be immersed in the electrolyte, a reference electrode, means operable when the device is immersed in an electrolyte for forming an ion-conducting connection between the auxiliary electrode and the reference electrode, one end of said connection opening in the immediate vicinity of a face of the auxiliary electrode which is exposed to the electrolyte, and measuring means connected to said auxiliary and reference electrodes, said device comprising a body of insulating material having a space therein in which said reference electrode is positioned, said ion-conducting connection comprising a passage within said body communicating with said space and adapted to contain electrolyte when the device is immersed therein, said auxiliary electrode being secured to said body of insulting material, said passage extending through said auxiliary electrode and being insulated therefrom.

References Cited

UNITED STATES PATENTS

| | | | |
|---|---|---|---|
| 1,735,878 | 11/1929 | Pfanhauser | 204—195 |
| 2,584,816 | 2/1952 | Sands | 204—231 |
| 3,067,123 | 12/1962 | Huber | 204—231 |
| 3,166,484 | 1/1965 | Hentz | 204—1 |
| 3,347,770 | 10/1967 | Valles et al. | 204—231 X |

FOREIGN PATENTS

| | | | |
|---|---|---|---|
| 941,362 | 11/1963 | Great Britain | 204—231 |
| 619,599 | 3/1949 | Great Britain | 204—231 |

GERALD L. KAPLAN, Primary Examiner

U.S. Cl. X.R.

204—195 F, 231, 279, 279 R